(No Model.)

J. H. DEPEW.
CAR COUPLING.

No. 279,229.　　　　　　　　Patented June 12, 1883.

Witnesses　　　　　　　　　　　　　Inventor

UNITED STATES PATENT OFFICE.

JOHN H. DEPEW, OF PEEKSKILL, NEW YORK, ASSIGNOR TO HIMSELF, JAMES DEPEW, AND JAMES C. ACKER, OF SAME PLACE.

CAR-COUPLING.

SPECIFICATION forming part of Letters Patent No. 279,229, dated June 12, 1883.

Application filed November 29, 1882. (No model.)

*To all whom it may concern:*

Be it known that I, JOHN H. DEPEW, of Peekskill, Westchester county, in the State of New York, have invented certain new and useful Improvements in Car-Couplings, of which the following is a specification.

The invention is particularly adapted for freight-cars. I have devised peculiarly efficient and simple provisions whereby the cars may be made self-coupling at will, and changes from a non-coupling condition to a coupling condition, and back again, may be effected from either side or from the top of the car. I provide for also coupling by a coupling link and pin when required.

The accompanying drawings form a part of this specification and represent what I consider the best means of carrying out the invention.

Figure 1:
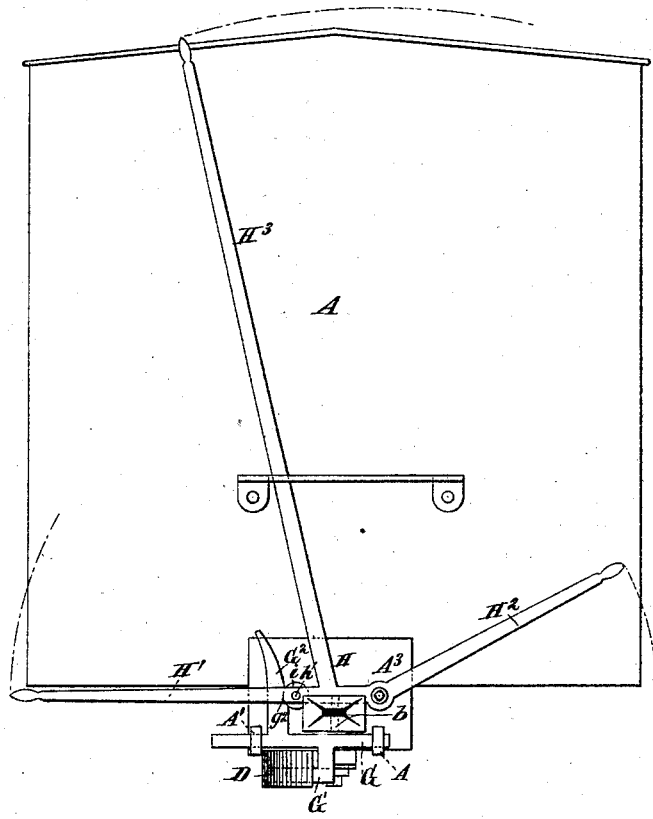
Figure 2:
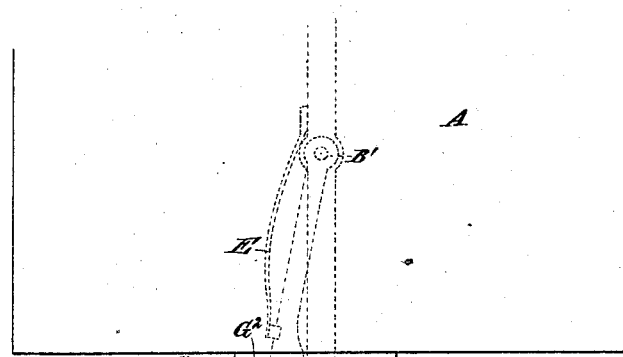

Figure 1 is an end elevation of the body of a freight-car provided with my invention. Fig. 2 is a corresponding plan view.

Similar letters of reference indicate corresponding parts in both the figures.

A is the car-body.

B is a stout bar, capable of moving to a moderate extent longitudinally in its bearings under the car-body and subject to the influence of a strong spring, (not shown,) which may be of the ordinary construction, adapted to sufficiently resist the movement of the bar B longitudinally in either direction. The outer end of the bar B is equipped to receive an ordinary coupling-link (not represented) inserted in a hole, $b$. The outer end of the bar B is also slightly rounded and adapted to serve as a buffer in receiving the shock and transmitting it to the spring when one car presses forcibly against another in stopping, or under any other conditions.

B' is a stout eye fixed on the under side of the bar B, a considerable distance inward under the car-body. It carries the stout hook-formed link D, which is subject to a sufficient spring, E, bolted on the side of the eye B' or on the side of the rod B, so as to exert its force on the link D, tending to urge it to and beyond a line parallel with the bar B; but it may be swung by any sufficient force into the angular position shown, the spring E yielding to allow such motion.

A slide, G, mounted in bearings A' A$^2$, is capable of sliding transversely of the car, and performs important functions. A bent arm or yoke, G', on the under side, partly embraces the link D, as shown. An arm, G$^2$, on the upper side, is provided with a slight notch or recess, $g^2$.

A three-armed lever is mounted on a fixed pin, A$^3$, with the extremities of its several arms presented one at or near each side of the car and the third at or near the top. I will designate the lever as a whole, when necessary, by the single letter H, using additional marks, as H' H$^2$, &c., to designate special parts. The arm H' extends across over the bar B, and carries a pin, $h'$, on which is mounted a roller, I. An arm which extends in the direction nearly opposite to H' is marked H$^2$. An arm which extends upward is marked H$^3$. The latter is inclosed within a housing, which aids to support the lever in the proper plane and to serve as a stop to prevent its moving too far. The force of the spring E, acting through the link D and slide G, urges in such direction that the arm G$^2$ is pressed forcibly against the roller I. When the lever H is turned in the proper position the roller I is raised to such elevation that the curved upper end of the arm G$^2$ in resting against the roller allows the link D to come into line with the bar B. Thus conditioned the car will couple with any other car similarly conditioned. When the lever H is by any means turned into the opposite position its roller I is traversed downward on the smoothly-rounded face of G$^2$ until it rests in the shallow notch or hollow recess $g^2$. In doing so it moves the slide G, and consequently the link D, forcibly out of its position under the bar B to such an extent as to forbid its engaging with the next car. The arm H' allows this operation to be effected from one side of the car. The arm H$^2$ allows it to be effected from the opposite side of the car, and the arm H$^3$ allows it to be effected from the top of the car. The notch $g^2$ receives the roller I in such manner as to hold the lever H, and consequently all the parts, with considerable force in the uncoupling position; but this notch must not be made so deep or its sides so steep that the force of the attendant cannot readily turn the lever H and cause the parts to rapidly assume the condition for coupling.

To operate the invention the lever H is thrown into one extreme or the other extreme position, according as it is desired that the car shall couple by means of its hook-link D or not. When it is desired to couple, the link D is allowed to swing into position parallel with the bar B. When it is to not couple, it is held forcibly out to one side by the slide G, actuated by the roller I, and engaging with the link D by the yoke G'.

When the parts are arranged for coupling, the ends of two cars provided with these couplings are brought together, the inclined ends of the hooks D act on each other to deflect them temporarily, and, as soon as the cars are sufficiently forced together, the links D swing back into the central position and are strongly engaged. When, after being coupled, it is desired to uncouple, the operation is effected by simply turning the lever H of either one or both of the cars.

When it is desired to engage one of my couplings with an ordinary link-coupling the lever H is turned in the position to uncouple the link D or to throw it out of the central position. In this position it is not only incapable of coupling with a corresponding link of the other car, but it is out of the way and performs no function, good or bad. Thus conditioned the car equipped with my coupling may engage with a car equipped with ordinary couplings by receiving a link (not represented) in the recess provided in the end of the bar B and confining such link by a pin inserted in the hole $b$.

Modifications may be made in the forms and proportions without departing from the principle or sacrificing the advantages of the invention. I can work the lever H by the single arm $H^3$ at the top of the car without the arms H' or $H^2$, providing a short arm to carry the roller I. The invention may be worked with some success by a pin or cam, in place of the roller I. I can realize some of the advantages without the provision for coupling by a link in the ordinary manner.

I claim as my invention—

1. In a car-coupling, the lever H, arranged to be operated from three points, in combination with the yoke G G' $G^2$, hook-link D, and spring E, substantially as herein specified.

2. In a car-coupling having a swinging hook-link, D, and spring E, as specified, the yoke G G' $G^2$, having a notch, $g^2$, in combination with a lever, H, carrying an engaging-piece, I, adapted to lock in the notch and retain the parts in the uncoupling condition with some force, as herein specified.

3. In a car-coupling, the bar B, equipped for engagement with an ordinary coupling-link by a pin inserted in the hole $b$, in combination with the swinging hook-link D and spring E, so as to couple either by the bar B or by the link D, as required, both being served by the same spring, C, substantially as herein specified.

In testimony whereof I have hereunto set my hand, at Peekskill, New York, this 21st day of November, 1882, in the presence of two subscribing witnesses.

JOHN H. DEPEW.

Witnesses:
AARON W. WYATT,
BENJ. F. FERRIS.